Patented May 29, 1945

2,377,041

UNITED STATES PATENT OFFICE 2,377,041

DENTAL LINER

Sam Rogover, Chicago, Ill.

No Drawing. Application August 25, 1944,
Serial No. 551,264

3 Claims. (Cl. 260—36)

The invention relates to a composition of matter and more particularly to a composition for forming a lining for dental plates.

Dental plates even when carefully fitted do not retain a satisfactory fit due to subsequent shrinkage of the gums so that various attempts have been made to provide linings for dental plates, which would produce an accurate fit.

However, the linings heretofore used contain gum copal, rosin, or shellac, which are natural resins and cannot form a permanent union with the dental plate but are physical in action and gradually deteriorate. These linings have odors due to the alcohol solvent and have a slightly burning sensation. Where other solvents are employed, such as acetone, chloroform, ether, butyl acetate and the like, a burning or searing sensation is noticed in the gums accompanied by foul odor and taste.

It is, therefore, an object of the invention to provide a lining made of a composition which normally is semi-plastic and rubbery in consistency and gradually hardens in the mouth under the oral acids and heat and forms a perfect union with the denture plates.

A further object constitutes to provide a composition for denture linings which has permanent shelf life, is odorless, tasteless and possesses no burning or searing properties and does not affect the mucous membranes of the mouth.

It is a further object to employ methyl methacrylate resin plasticized by a solvent which is fugitive under the oral acids and heat, and which when used as a dental liner does not burn the gum tissue, is odorless and tasteless, and because of its glycerine base does not harden when exposed to air.

A still further object constitutes the provision of a composition used for dental linings and normally has jelly-like consistency to be self-molding obviating the necessity of using Cellophane, is permanently and homogeneously united with the dental plate and does not deteriorate.

It is a further object to provide a liner of the same material as the denture, but applied in a semi-plastic state, which when hardened in the mouth forms an integral part of the denture.

With these and other important objects in view which will become apparent from a perusal of the invention the latter comprises the ingredients and manner of mixing the same as described in the following specification and particularly pointed out in the claims forming a part thereof.

In compounding the composition a synthetic resin such as methyl methacrylate resin, vinyl resin or cellulose resin is employed.

As a plasticizer a glycerol ester is used and the semi-plastic resin is unaffected by air due to its glycerine base and can be stored for an indefinite length of time without changing its consistency.

This composition is self-molding and when applied by a spatulum to a dental plate shapes itself to the contour of the mouth.

The solvent under the influence of heat, acids and secretions of the oral cavity becomes fugitive leaving the plasticized liner to set and form a perfect union or amalgamation with the denture which being of the same material as the liner results in an integral structure therewith and may be then polished.

As solvents I have found triacetin, diacetin and acetin as most suitable to become fugitive under the acids, heat and saliva of the oral cavity and leaving a lining homogeneously united with the dental plate and permanently integrated therewith.

A specific example is as follows: 1 lb. of methyl methacrylate resin, together with two lbs. of triacetin is placed in a double boiler under heat at a temperature of 100° F. and above, the mixture being stirred to a homogeneous mass of syrupy consistency.

Thereafter the mass is permitted to cool until it gradually congeals to a clear semi-solid or semi-plastic gel and remains in said condition so that it may be bottled and placed on the shelf for an indefinite length of time.

Thereafter the dentist applies the composition with a spatulum to the dental plate which when placed in the mouth causes the composition to shape itself to the contour of the gum.

The composition becomes hard under the saliva heat and acids of the oral cavity while the solvent becomes fugitive and the lining thus becomes an integral part of the dental plate.

It is, of course, understood that the proportion of acrylic resin and triacetin depends upon the consistency to be obtained.

Instead of triacetin, diacetin or acetin or a mixture thereof may be used.

While the foregoing describes one embodiment of the invention equivalent ingredients may be used.

I, therefore, wish to include all changes coming within the scope of the invention as defined in the appended claims.

I claim:

1. A liner for dentures comprising a methyl methacrylate resin plasticized by the ester produced by the reaction of glycerine solely with acetic acid and substantially employed in the ratio of one part by weight of resin to two parts by weight of the plasticizer to obtain jelly like consistency, such liner hardening under the influence of oral acidity and heat into an integral structure with the denture.

2. A liner for dentures comprising a methyl methacrylate resin plasticized by triacetin substantially employed in the ratio of one part by weight of resin to two parts by weight of the plasticizer to obtain jelly like consistency, such liner hardening under the influence of oral acidity and heat into an integral structure with the denture.

3. A liner for dentures comprising a methyl methacrylate resin plasticized by diacetin substantially employed in the ratio of one part by weight of resin to two parts by weight of the plasticizer to obtain jelly like consistency, such liner hardening under the influence of oral acidity and heat into an integral structure with the denture.

SAM ROGOVER.